INVENTOR.
HARRY T. PARIGINI
BY Mellin and Hanscom
Attorneys

Sept. 27, 1960

H. T. PARIGINI

DISC COMPUTER 2,954,162

Filed July 5, 1957

4 Sheets-Sheet 2

INVENTOR.
HARRY T. PARIGINI
BY Mellin and Hanscom
Attorneys

Sept. 27, 1960 H. T. PARIGINI 2,954,162

DISC COMPUTER

Filed July 5, 1957 4 Sheets-Sheet 3

INVENTOR.
HARRY T. PARIGINI

BY Mellin and Hanscom

Attorneys

Sept. 27, 1960 H. T. PARIGINI 2,954,162

DISC COMPUTER

Filed July 5, 1957 4 Sheets-Sheet 4

INVENTOR.
HARRY T. PARIGINI
BY Mellin and Hanscom
Attorneys 2,954,162

DISC COMPUTER

Harry T. Parigini, Sacramento, Calif.
(1822 Lawndale Ave., San Leandro, Calif.)

Filed July 5, 1957, Ser. No. 670,034

2 Claims. (Cl. 235—78)

This invention relates to disc computers and, in general, has for its object the provision of a computer including a disc or several superposed discs, each bearing three sets of correlated figures or data arranged in circular columns and radical rows and each disc being provided with a radially movable slide pivoted thereto and provided with three radially spaced windows which can be selectively placed in registration with any three members of the three correlated sets of numbers.

Most manufacturing concerns keep a quarterly or annual count of the quantity of each item used, but for the purposes of maintaining their inventory by reordering such items, it is necessary to reduce the annual and quarterly consumption figures to average monthly figures. This can, of course, be done by a simple process of division or by the use of a slide rule. However, since thousands of different items are involved and have to be continually reordered, the reduction of the actual annual or quarterly consumption to an average monthly consumption by either of these means not only becomes exceedingly tedious but involves too many chances for error.

Specifically, one of the objects of this invention is the provision of a multiple coaxial disc type of computer wherein each disc is provided with one set of progression of numbers representing the actual annual or quarterly consumption of any given item, with another set of progression of numbers each substantially equal to one-third of one of the numbers of the first progression of numbers, and with a third set of progression of numbers each equal to substantially one-twelfth of one of the numbers of the first progression of numbers; a slide having three radially aligned and spaced windows being associated with each disc and so related to the three sets of progressions of numbers imprinted thereon that when the first window of the slide is placed over one of the numbers of the first progression of numbers, a number equal substantially to a third of that number will appear in the second window and a number equal to one-twelfth of said number will appear in the third window.

Still another object of this invention is the provision of a computer of the character above described wherein the three sets of numbers imprinted on each succeeding disc are a continuation of the three sets of progression of numbers imprinted on the preceding disc, thereby to increase the range of the computer without increasing the diameter thereof.

A further object of this invention is the provision of a computer of the character above described wherein each disc, other than the bottom disc, is provided with transparent sectors through which a sector of the numbers imprinted on any underlying disc can be viewed.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings.

*General assembly*

Figure 2:
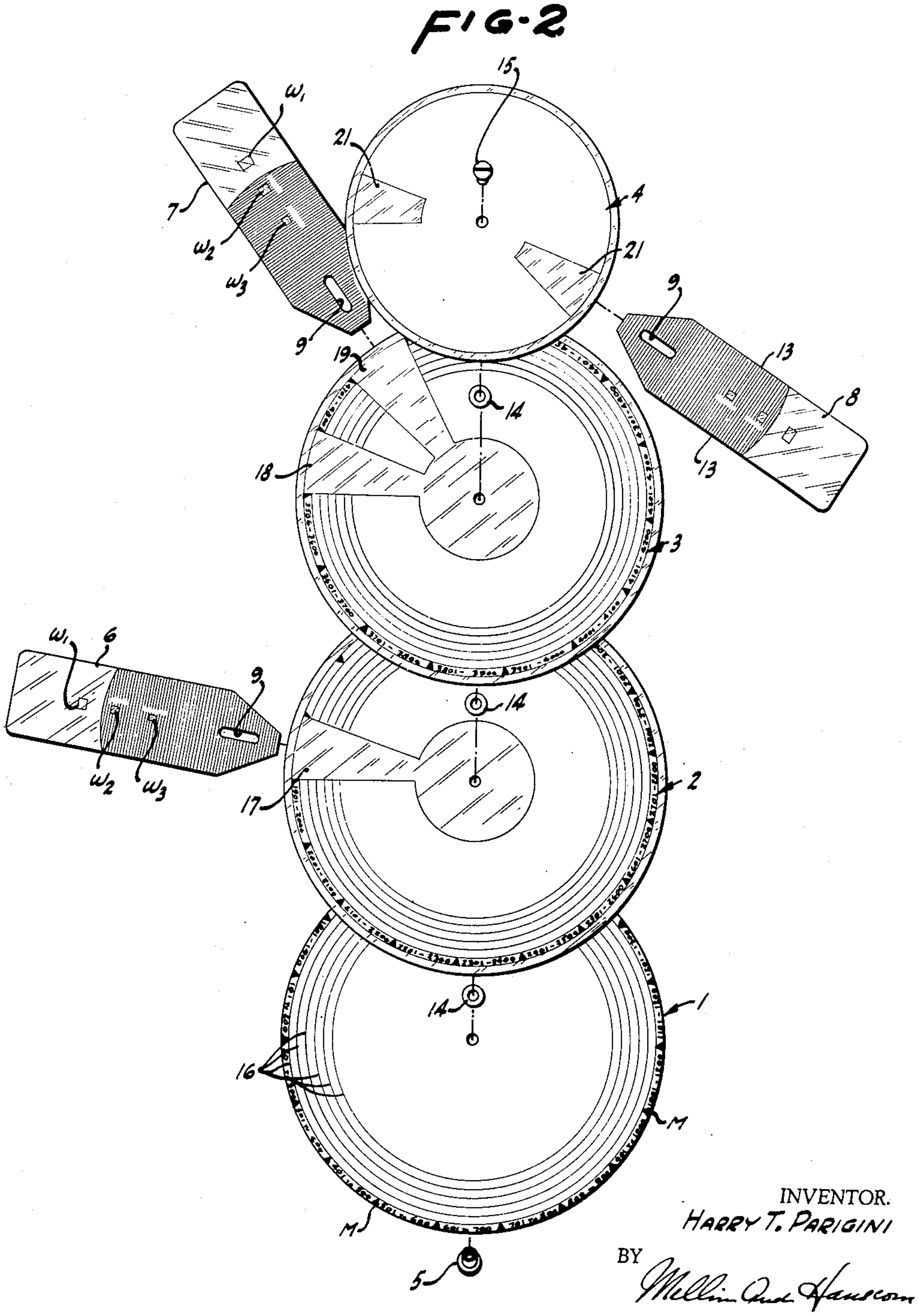
Fig. 2 is an exploded view of the computer illustrated in Fig. 1.

As best illustrated in Fig. 2, a computer embodying the objects of my invention may include a superposed set of transparent plastic discs 1, 2, 3 and 4, all mounted for rotation relative to each other on a common axial pivotal pin 5.

Associated, respectively, with each of these discs 2, 3 and 4 and lying therebeneath are generally rectangular transparent plastic slides 6, 7 and 8, each provided at one end with an elongated slot 9 for receiving the pin 5. Cemented or otherwise secured to the lower face of each of the discs 2, 3 and 4 is a pair of spaced parallel vertically offset guide strips 11 forming guide channels or trackways 12 for the reception of the lateral edges 13 of the adjacent slide. As a result of this construction, each of the slides 6, 7 and 8 is fixed against relative rotation with respect to its associated disc but is free to move radially thereof within the limits of its elongated slot 9. Mounted on the pin 5 between each adjacent pair of discs and their associated slides is a washer 14 serving to decrease the frictional resistance of these members when they are rotated relative to each other. Threaded to the upper end of the pin 5 is a screw 15 for locking the entire assembly into a unitary structure wherein all of the discs can be rotated relative to each other and wherein each of the slides can be moved radially relative to its associated disc. Here it should be noted that the discs 1 and 2 are of equal radii, that the radius of the disc 2 is greater than the radius of the disc 3, and that the radius of the disc 3 is greater than the radius of the disc 4. Also, it might be noted that the slides 6, 7 and 8 are of a length sufficient to protrude substantially beyond their associated discs, even when the former are closed to their innermost positions.

*Details of lower disc 1*

Figure 1:
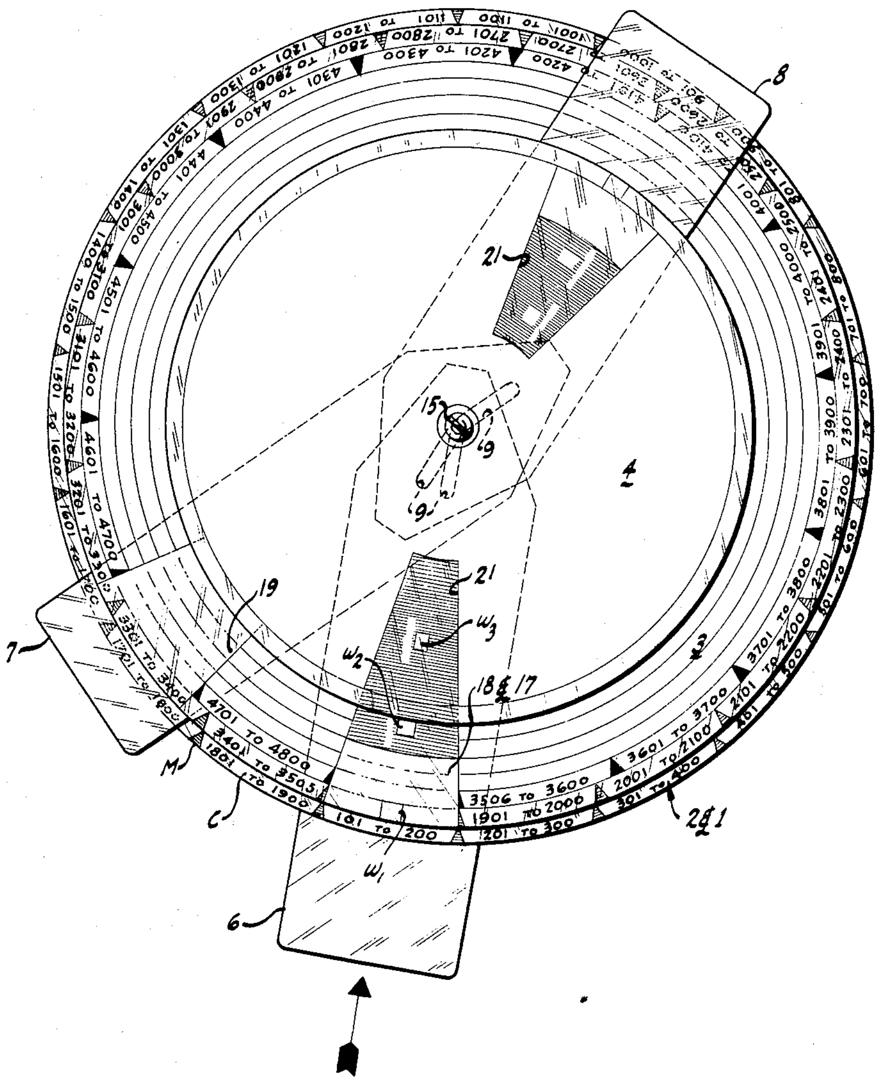
Fig. 1 is a top plan view of a computer embodying the objects of my invention.
Figure 3:
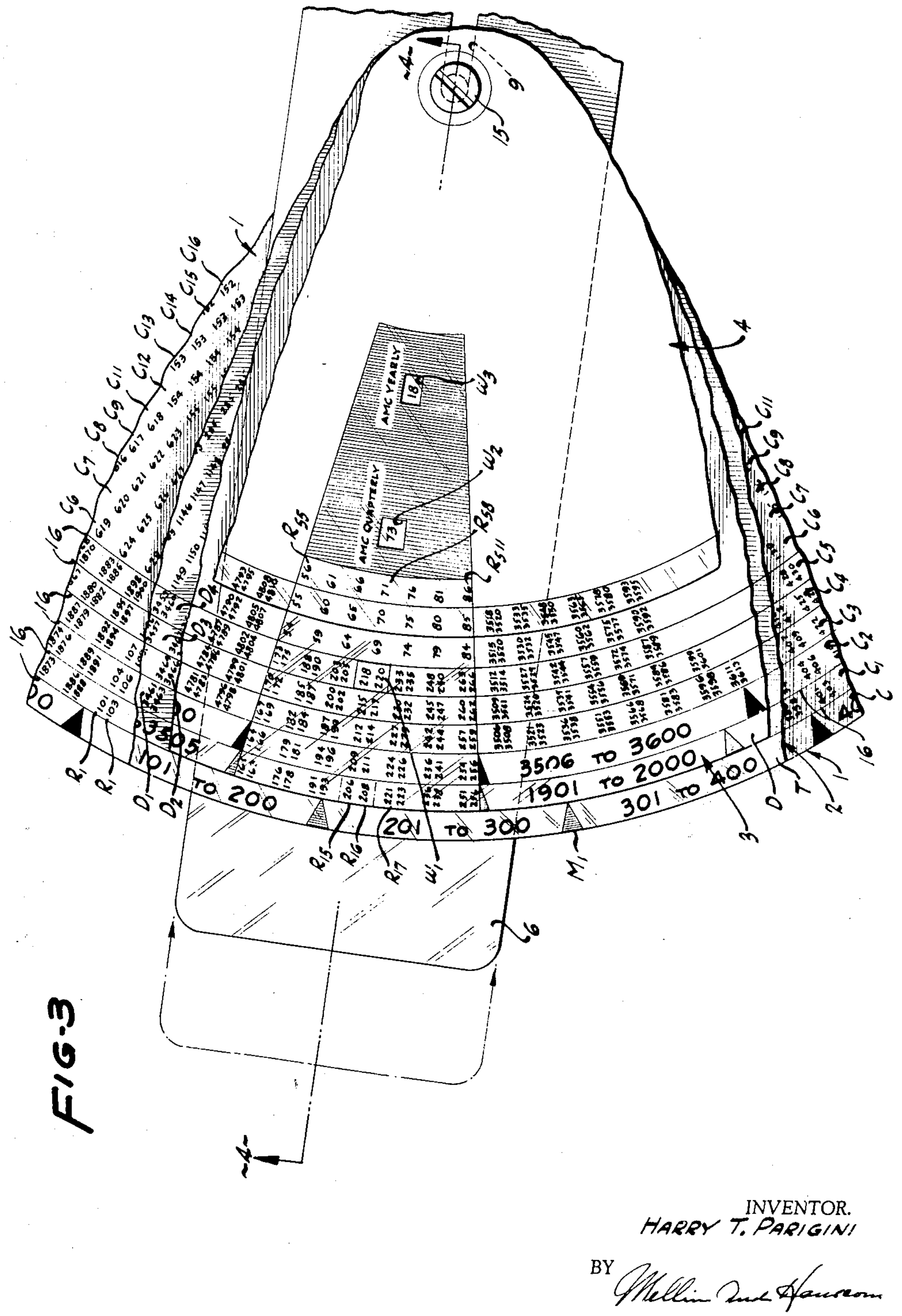
Fig. 3 is an enlarged fragmentary detail of a sector of the computer illustrated in Figs. 1 and 2.
Figure 4:
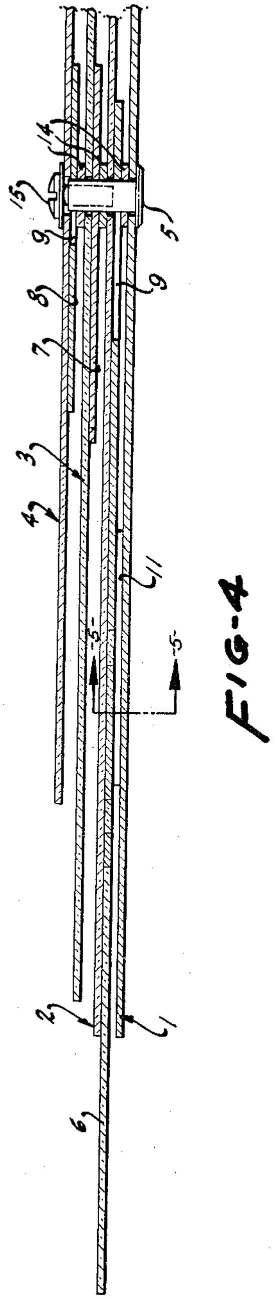
Fig. 4 is a fragmentary section taken on the section line 4—4 of Fig. 3.
Figure 5:
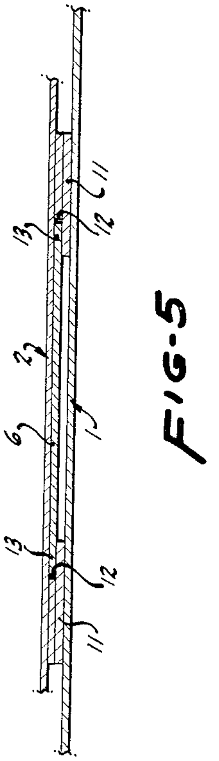
Fig. 5 is a fragmentary section taken on the section line 5—5 of Fig. 4.

Embossed or imprinted along the outer periphery of the disc 1 are a plurality of equally spaced circles 16 (here shown as six in number) dividing this portion of the disc into a first set of six circular columns C, $C_1$, $C_2$, $C_3$, $C_4$, and $C_5$. Imprinted in the columns $C_1$ to $C_5$ is a mathematical progression of numbers arranged in spaced pairs of radial rows $R_1$, $R_2$, $R_3$, etc., extending clear around the disc. Imprinted in the circular column C are circumferentially spaced triangular fiducial marks M and indicated between each adjacent pair of marks M is the range of numbers imprinted in the columns $C_1$—$C_5$ subtended by each two adjacent fiducial marks. As illustrated in Figs. 1 and 3, each pair of marks M on the lower disc 1 includes a range of 100 hundred numbers. The first 100 numbers so indicated on disc 1 between the first pair of fiducial marks ranges from 101 to 200 and the second pair of fiducial marks includes the numbers 201 to 300, etc. The numbers in each pair of radial rows of numbers lying within the columns $C_1$—$C_5$ are arranged in a mathematical progression wherein, if any number is represented by the letter $n$, the next succeeding number in any given row is $n+3$. For example, the first number in row $R_1$ of column $C_1$ ($R_1C_1$) of disc 1 is 101 (Fig. 3, lower left-hand corner) and the next succeeding numbers (radially inward) are 104, 107, 107 + 3, etc. In the lower row $R_1$ of this same pair of rows, the order of numbers is 103, 106, 109, etc. Here, again, each radially aligned number may be $n+3$ where the preceding number is $n$. From a consideration of rows $R_{15}$, $R_{16}$ and $R_{17}$, it will be seen that the number in $C_5R_{15}$ is 218 and that the number in $C_1R_{17}$ is 221 or 218 + 3. It is therefore apparent that the same mathematical progression has been maintained in going from $C_5R_{15}$ to $C_1R_{17}$ or from $C_5R_{16}$ to $C_1R_{18}$. Here it should be observed that the notation $C_1R_{18}$ is used to indicate the number 223 lying in row $R_{18}$ of column $C_1$, etc.

Imprinted on the disc 1 radially inward of the first set of numbers is another set of numbers arranged in circular columns $C_6$, $C_7$, $C_8$, $C_9$ and $C_{11}$ and in radial rows $R_{s1}$ to $R_{sn}$. Here it should be noted that the $R_s$ series of radial rows lies intermediate the adjacent sets or pairs of rows R. For example and as illustrated in Fig. 3, the row $R_{s-8}$ lies intermediate the pair of rows $R_{15}$ and $R_{16}$.

The numbers in the second set of columns $C_6$—$C_{11}$ are arranged in simple arithmetic progression wherein each number in any row differs by 1 from the preceding number and wherein the first number in each row is a continuation of the last number in the preceding row. Furthermore, the numbers in this second set of columns are correlated with the numbers in the first set of columns of numbers in that in any given row, the number in the first column of the second set of columns is one-third of the mean of the two radially aligned numbers appearing in the first column of the first set of columns. For example, and as shown in Fig. 3, the number 74 in $C_6R_{s-9}$ is one-third of the mean of the numbers 221 and 223 appearing in $C_1R_{17}$ and $C_1R_{18}$, and, similarly, the number 73 appearing in $C_6$ is one-third of the mean of the two numbers 218 and 220 appearing in $C_5R_{15}$ and $C_5R_{16}$.

Embossed or imprinted on the disc 1 is a third series of numbers arranged in circular columns $C_{12}$ to $C_{16}$ and in the radial rows $R_{s1}$ to $R_{sn}$. Each of these numbers represents one-twelfth or the nearest approximation thereto of the mean of each pair of numbers appearing in columns $C_1$—$C_5$. For example, the number 18 of $C_{16}R_{s8}$ is one-twelfth of the mean of the radially aligned pair of numbers 206 and 208 appearing in column $C_1$.

In summary, it will be seen that: there are embossed or imprinted on the disc 1 three sets of columns of numbers, all arranged in radial rows; that the numbers in the first set of columns are arranged in paired rows; that the rows of numbers in the second and third sets of columns are radially aligned between the pairs of rows of the first set of columns of numbers; that each number in the second set of columns of numbers represents one-third of the mean of one pair of numbers of the first set of columns of numbers and that each number in the third set of columns of numbers represents one-twelfth of the mean of one or more pairs of numbers in the first set of columns of numbers.

As previously stated, the disc 2 is mounted on the pin 5 over the disc 1 and for relative rotation thereto. Also, as previously stated, a slide 6 is mounted on the pin 5 beneath the disc 2 for rotation therewith and radial movement relative to the disc 2 and therefore also relative to the disc 1.

Outlined on the slide 6 are three radially aligned and spaced rectangular windows $W_1$, $W_2$ and $W_3$. The dimensions of the window $W_1$ should be such that any set of paired numbers appearing in any of the columns $C_1$—$C_5$ can be viewed therethrough. The other two windows $W_2$ and $W_3$ need be only of such a size that any one number respectively occurring in columns $C_6$—$C_{11}$ and $C_{12}$—$C_{16}$ can be viewed therethrough. The radial spacing of these three windows must be such that when the window $W_1$ lies in column $C_1$, the window $W_2$ lies in column $C_6$ and the window $W_3$ lies in column $C_{12}$. Also, the radial spacing of all of the columns should be such that when the slide 6 is shifted radially so that the window $W_1$ lies in column $C_2$, the window $W_2$ lies in column $C_7$, and the window $W_3$ lies in column $C_{13}$, etc.

Indicated adjacent the window $W_2$ is the notation "AMC Quarterly," AMC being an abbreviation of "average monthly consumption." The complete notation then means that if any figure visible through the window $W_1$ be assumed to represent the quantity of any item used during the preceding three months' period, the figure visible through the window $W_2$ will represent the corresponding monthly consumption of that item calculated on the basis of quantity of such item used during the preceding quarter.

Similarly, there is indicated adjacent the window $W_3$ the notation "AMC yearly," this notation designating that the figure appearing in this window represents the average monthly consumption of any item based on the yearly consumption of such item as reflected by the number visible in window $W_1$. In other words, the figures appearing in window $W_1$ are here assumed to represent the actual yearly consumption of the item.

Since, for practical purposes, there is a limit to the size of a disc computer of this character which can be used conveniently, and since only a limited number of figures can be placed in the inner rows of figures of a disc of a given size, the advantage of being able to treat the figures of the outer set of the columns of figures as representing either the actual yearly consumption or the actual quarterly consumption of any item can be readily appreciated. This, of course, is made possible by providing the disc with two other sets of columns of figures.

Here it is to be observed that within the limits of its range of numbers, the disc 1 and its slide 6 alone form a complete computer. Here the disc 2 can be dispensed with entirely.

Preferably, that portion of the slide 6 overlapping the disc 1 and containing the windows $W_2$ and $W_3$ is rendered opaque so as to avoid confusion when reading numbers through these windows. That portion of the slide surrounding the window $W_1$ should preferably be left transparent so as to facilitate locating the window over the desired pair of windows.

Although there is nothing critical with respect to the range of the numbers inscribed on the disc 1 or the discs 2 and 3, it has been found that if the disc 1 is in the order of 12 inches in diameter, it will conveniently take a progression of numbers in the circular column $C_1$ running from 101 to 1900 on its outer periphery without unduly cramping the numbers appearing in the circular column $C_5$ or rendering such numbers unduly small.

Optionally, the disc may be covered with a protective transparency T permanently affixed thereto.

*Construction and function of disc 2*

Generally, the construction and function of disc 2 is similar to that of disc 1, the figures in its three sets of columns of figures being merely a continuation or extension of numbers appearing in the corresponding columns of numbers indicated on disc 1. As indicated in outer circular column D of disc 2, the numbers in columns $D_1$, $D_2$, $D_3$, $D_4$ and $D_5$ run from 1901 to 3505.

In disc 2, as in disc 1, there are two series of columns of numbers in radial alignment with the numbers in columns $D_1$—$D_5$, the numbers of the innermost series being approximately one-twelfth of the radially aligned numbers in the outer series and the numbers in the intermediate series being approximately one-third of the outer series of numbers.

Cooperating with the disc 2 is the slide 7, which, like the slide 6, is provided with three windows $W_1$, $W_2$ and $W_3$ registrable with the three sets of numbers of disc 2.

Unlike disc 1, however, disc 2 is provided with a transparent sector 17 in radial registration with the underlying slide 6, this being necessary in order to avoid blanking off the windows $W_1$, $W_2$ and $W_3$ of the slide 6. For this reason, the numbers on disc 2 start and terminate at the radial boundaries of the transparent sector 17.

Disc 3 has inscribed thereon three sets of numbers which are merely a continuation of the numbers inscribed on disc 2. Here the outer set of numbers runs from 3506 to 4800 but is interrupted by two transparent sectors 18 and 19. The sector 19 is located in registration with the slide 7 so as to avoid blanking off the windows $W_1$, $W_2$ and $W_3$ thereof. The transparent sector 18 is desirable for lining up with the slide 6 and its windows. Here it should be noted that although the sector 19 can be lined up with the slide 6, this is not desirable for the slide 7 associated with the sector 19 carries the outline of its window $W_1$ and, consequently, this window, as well as the window $W_1$ of the slide 6, would be visible when operating on disc 2. This, of course, would be confusing. The exact location of the sector 18 is immaterial so long as it is spaced to some extent from the window 19.

The last and uppermost disc 4 serves as a support for the slide 8, which, like the slides 6 and 7, is provided with windows $W_1$, $W_2$ and $W_3$. Provided in this disc is a transparent sector 21 in registration with its slide 8 and with an additional transparent sector 22. The remainder of the disc should preferably be opaque so as to blank off all numbers beneath it except those being viewed through one or the other of the sectors 21 and 22.

Preferably, to avoid confusion, the discs 1, 2, 3 and 4 are made of four different and contrasting colors.

*Operation*

As already indicated, the outside set of numbers of each of the discs 1, 2 and 3 can be treated as representing either the actual annual consumption of any item or its actual quarterly consumption. If they are treated as the actual annual consumption then the calculated monthly consumption appears in the inside window $W_3$ of the slide operatively associated therewith. If, on the other hand, the outer set of numbers is treated as the actual quarterly consumption, then the calculated monthly consumption appears in the intermediate window $W_2$ of the same slide.

If the number corresponding to the actual annual (any consecutive twelve months' period) or quarterly (any consecutive three months' period) consumption of an item in question falls within the range of the outer set of numbers of the lower disc 1, say, for example, the number 219, the transparent sector 18 of the disc 3 and the transparent sector 21 of the disc 4 are first brought into registration with the slide 6. This having been done, the slide 6 is rotated about its pivotal point and discs 3 and 4 are rotated bodily so as to bring the window $W_1$ of the slide 6 into radial alignment with that row of numbers of the outer set of numbers of the disc containing the number 219 or the nearest number thereto. The slide 6 is then moved radially so as to bring its window $W_1$ over that number. From an inspection of Fig. 3, it will be noted that there is no number 219 on the disc 1 and that, consequently, the window $W_1$ has to be placed over the pair of numbers 218 and 220. If, then, the number 219 is considered as the actual consumption of the item in question during the immediately preceding twelve months' period, the corresponding average monthly consumption will appear in the window $W_3$ of the slide 6 and is found to be 18, this being the integer which most closely approximates one-twelfth of the number 219.

If, on the other hand, the number 219 is taken as representing the actual consumption of the item in question during the immediately preceding three months' period (quarter), then the corresponding monthly consumption will appear in the window $W_2$ of the slide 6 and is found to be 73. Here it will be seen that 73 happens to be exactly one-third of the number 219.

If the number representing either the actual annual or quarterly consumption of any item under consideration does not fall within the range of disc 1, then resort is had to either disc 2 or disc 3. Here assume, for example, that it be found from the corporation's records that 3300 of a specified item have been consumed during the immediately preceding twelve-month period and it is desired to determine what this represents in terms of the average monthly consumption of the item. The disc 1 can now be disregarded. The transparent sector 21 of the disc 4 is placed over the slide 7 and then the slide 7 and the disc 4 are bodily rotated so as to bring the window $W_1$ of the slide 7 into radial alignment with the number 3300 (or the nearest number thereto) on the disc 2. The slide 7 is then moved radially thereby to place its window $W_1$ over the number 3300 or that pair of numbers which includes the number 3300. The average monthly consumption will then appear within the window $W_3$ of the slide 7. If the number 3300 has been taken as representing the actual quarterly consumption of the item in question, the corresponding average monthly consumption will appear in window $W_2$ of slide 7.

If the actual consumption number is within the range of disc 3, then discs 1 and 2 may be disregarded and slide 8 merely used in conjunction with disc 3 in the same manner as required for making calculations on disc 2 with slide 7, and on disc 1 with slide 6.

The term "factor" as herein used is not to be limited to the actual mathematical factor of a number but shall be deemed to include the integer most closely approximating such actual mathematical factor. Here it should be observed that the first set of numbers appearing on each of the discs and representing either the actual annual or quarterly consumption of any item is arranged in a series, wherein if $n$ represents any number of the series, $n+3$ represents the next succeeding number located radially inward of the first number. Also, as above described, this series of numbers is arranged in peripherally spaced pairs of radial rows wherein if $n$ represents any number of the upper row of a pair of rows, the number below the number $n$ can be represented by $n+2$. This particular arrangement is not critical but has been chosen merely for the reason that for all practical purposes it is just as good as a straight arithmetical progression ($n$, $n+1$, $n+2$ . . .) but has the decided advantage that it makes possible the material increase of the range of numbers imprinted on each disc. In this connection, it should be noted that the lowest number on disc 1 is 101 and that if this number be considered as representing the annual consumption of an item, its monthly consumption as represented by the nearest integer would be 8. Actually, the first few members in the third of monthly set of numbers is broken down into fractions so that the monthly number corresponding to an actual annual consumption of between 101 and 103 appears under the window $W_3$ of the slide 6 as 8½. However, aside from these first few numbers, only the nearest integer appears.

I claim:

1. A computer comprising: a plurality of stacked discs each having imprinted thereon in circular columns and radial rows first, second, and third radially spaced sets of integral numbers, the numbers in said first set of numbers being in a predetermined mathematical progression, the numbers in said second row each being a first integral factor of one of the radially aligned numbers of said first set of numbers and each of the numbers of said third set of numbers being another and different integral factor of the same radially aligned number of said first set of numbers; and a slide associated with each of said discs for rotation on the axis thereof and for radial translatory movement relative thereto, each said slide being provided with first, second, and third radially aligned windows, said first window being arranged upon the adjustment of said slide to be selectively placed over any predetermined number of the said first set of numbers of its associated disc whereupon its second window will then be in registration with the first said factor of said predetermined number of said associated disc and said third window will be in registration with said second factor of said number of said associated disc; the three sets of numbers imprinted on each succeeding disc being a continuation respectively of the three sets of numbers imprinted on the immediately preceding disc and each succeeding disc being provided with a transparent sector through which a corresponding sector of the preceding disc can be viewed.

2. A computer of the character defined in claim 1 wherein the slide functionally associated with any preceding disc is slidably mounted in the next succeeding disc.

References Cited in the file of this patent

UNITED STATES PATENTS

| | | |
|---|---|---|
| 414,365 | Barker | Nov. 5, 1889 |
| 725,984 | Nelke | Apr. 21, 1903 |
| 877,230 | Roche | Jan. 21, 1908 |
| 962,441 | Lerner | June 28, 1910 |